(12) United States Patent
Beard et al.

(10) Patent No.: US 8,413,747 B2
(45) Date of Patent: Apr. 9, 2013

(54) SUSPENSION FOR AN ENDLESS TRACK CLIMBING MACHINE

(76) Inventors: James Walter Beard, Cookeville, TN (US); Stephen Lee Canfield, Cookeville, TN (US); Steven Marc Glovsky, Franklin, TN (US)

( * ) Notice: Subject to any disclaimer, the term of this patent is extended or adjusted under 35 U.S.C. 154(b) by 0 days.

(21) Appl. No.: 13/291,890

(22) Filed: Nov. 8, 2011

(65) Prior Publication Data

US 2012/0111649 A1 May 10, 2012

Related U.S. Application Data

(60) Provisional application No. 61/456,435, filed on Nov. 8, 2010.

(51) Int. Cl.
*B62D 55/00* (2006.01)

(52) U.S. Cl. .............................................. 180/9.1; 180/9

(58) Field of Classification Search ............... 180/9, 9.1, 180/9.28, 9.3, 9.32, 9.5; 280/5.22; 301/112, 301/71

See application file for complete search history.

(56) References Cited

U.S. PATENT DOCUMENTS

| | | | | |
|---|---|---|---|---|
| 4,671,369 A * | 6/1987 | Tiffin et al. | .................... | 180/8.1 |
| 4,708,218 A * | 11/1987 | Makela | .......................... | 180/9.5 |
| 6,237,706 B1 * | 5/2001 | Karpik et al. | ................ | 180/9.52 |
| 6,435,292 B2 * | 8/2002 | Lemke et al. | ................ | 180/9.62 |
| 6,860,571 B2 * | 3/2005 | Scheetz | ......................... | 305/143 |
| 7,343,991 B2 * | 3/2008 | Rittenhouse | ................... | 180/9.5 |
| 7,644,788 B2 * | 1/2010 | Scheetz | ........................ | 180/9.5 |
| 7,798,261 B1 * | 9/2010 | Rittenhouse | ................... | 180/9.5 |
| 8,083,014 B1 * | 12/2011 | Hall | .............................. | 180/9.1 |
| 2003/0116366 A1 * | 6/2003 | Simmons | ..................... | 180/9.62 |

* cited by examiner

*Primary Examiner* — Tashiana Adams

(57) ABSTRACT

An endless-track type climbing vehicle containing a multi-link suspension apparatus to uniformly distribute the forces on the on the adhering members while traversing irregular climbing surfaces. The multi-links suspension apparatus is able to conform to large range of surface irregularities while providing push and pulling forces on the adhering members to uniformly distribute the climbing loads on the adhering members. The result is a climbing machine that can accommodate large surface irregularities while maximizing the climbing payload with a minimum number and size of adhering members.

13 Claims, 11 Drawing Sheets

SUSPENSION FOR AN ENDLESS TRACK CLIMBING MACHINE

CROSS REFERENCE TO RELATED APPLICATIONS

This application claims the priority of U.S. Provisional Application Ser. No. 61/456,435 entitled "Suspension for a tracked climbing machine" filed on Nov. 8, 2010, the entire contents and substance of which are hereby incorporated in total by reference

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention applies to a category of self-propelled, climbing, mobile platforms that make use of endless tracks to connect to the climbing surface. For this purpose, the term climbing mobile platform refers to a vehicle that is capable of traversing a surface horizontally or vertically in some inclined position relative to the earth horizon. Further, it is intended that the mobile platforms are able to accommodate irregularity in the climbing surface including convex or concave regions. Such platforms may be used to conduct remote operations such as inspection, maintenance, or manufacturing in environments that pose difficulty or danger for human operation. These systems could be used in a wide variety of applications including power production, civil structures, or shipbuilding. A variety of climbing mobile platforms have been proposed to operate in these conditions.

The methods of achieving mobility for climbing platforms include but are not limited to legged locomotion, wheeled devices or endless tracks. The use of endless tracks in climbing platforms provides several advantages, including the potential for a large area of contact between the climbing surface and climbing vehicle. The large area of contact allows for a large distribution of adhering elements such as magnets, suction cups, adhesive, or other device. The endless track-type climbing vehicles presented in previous technologies make use of an endless track that makes contact with the climbing surface over a portion of the track, called here the contact portion of the track. The endless track contains the specific property that it has very high stiffness along the longitudinal axis of the track, but negligible stiffness in all transverse directions and negligible stiffness in bending or torsion. This creates a technical disadvantage in that the endless track is only able to transmit any significant level of forces in a direction along the longitudinal axis of the track. This property also allows the endless track to easily deflect in transverse directions or bend to accommodate irregular climbing surfaces. The result of this high longitudinal stiffness and negligible transverse or bending stiffness is that the endless track is only able to transfer forces normal to the climbing surface at the end portions of the contact region. These forces generally consist of those required to keep the climbing platform in equilibrium and in contact with the climbing surface. Thus, the adhering elements located at each end of the contact region support the majority of the climbing forces.

The performance of an endless-track type climbing platform depends on the ability to transfer forces from the collection of adhering members attached to the track, through the endless track to the platform body. There are a number of technologies that address how these forces are transferred from the endless track to the climbing platform body, and to a smaller degree how these forces are distributed to the collection of adhering members. The mechanism for doing this will be called the suspension system. The invention of this patent provides a novel means to distribute the climbing forces in an optimal manner over all adhering track elements while applying a positive surface normal force on the leading adhering member to ensure that it makes contact with surface when climbing.

The prior art considering tracked climbing vehicles with attached adhering members shows either systems without a suspension, or those with a suspension system designed for secondary purposes (for example, track removal from the climbing surface) rather than to distribute loads among the adhering members. Examples of the related prior art are provided as follows.

U.S. Pat. Nos. 5,435,405, 5,884,642, and Shen and Shen, 2005 show climbing vehicles with adhering members attached to an endless track without a suspension or no consideration given to the suspension. This causes the climbing forces to be transferred to the adhering members through the track and thus concentrates the climbing forces on the adhering members located at the ends of the contract region of the endless track.

U.S. Pat. Nos. 5,894,901 and 4,789,037 show climbing vehicles with adhering members attached to an endless track with press devices to push certain regions of the track into the climbing surface, in particular the leading edge of the track when traveling vertically up. However, these devices do not allow for the vehicle to pull on interior portions of the track in the direction of the surface normal and thus cannot distribute the climbing forces over the endless track.

U.S. Pat. No. 4,828,059 shows a climbing vehicle with adhering members attached to an endless track with a track guide that is used to engage and disengage the adhering members from the climbing surface. During operation, the track guide is not engaged and thus behaves as an endless track system that transfers climbing forces to the adhering members through the track.

U.S. Pat. No. 5,487,440 shows a climbing vehicle with adhering members attached to an endless track with a track guide rigidly attached to the vehicle chassis. This both limits the ability of the endless track to conform to the climbing surface and localizes the climbing loads to a small number of adhering members when traveling over any type of surface irregularity.

Xu and Ma (2002) shows an endless-track type climbing vehicle with type of climbing vehicle with magnets called magnetic suckers. A load distribution mechanism is presented as a three link member connected to the vehicle body with a single spring. The article does not show how the endless track would connect with the load scatter mechanism or how forces are transferred from the track to the mechanism. Further, as presented, the load scatter mechanism localizes moment-balance forces to the leading portion of the load scatter mechanism and similarly the leading edge of the endless track.

This patent most closely relates to a 2010 patent application by Canfield and Beard which demonstrates a climbing platform with endless tracks, adhering members attached directly to the endless tracks, with a compliant beam suspension system that connects the endless tracks to the platform chassis. The compliant beam mechanism allows the suspension to simultaneously adapt to irregularities in the climbing surface, while a collection of springs attached to the compliant beam provide the means to distribute forces among all the adhering members. This invention is unique in that it both distributes surface-normal climbing forces among all the adhering members and provides a force on the adhering member at the end of the contact region to ensure that the adhering member makes contact with the climbing surface.

This patent differs from the 2010 patent application by Canfield and Beard in two significant ways. First, the compliant beam portion of the compliant beam suspension apparatus must provide low rotational stiffness and large rotational deflection about the axis transverse to the axis of the endless track and lying in a plane tangent to the climbing surface at each point along the beam and high rotational stiffness in other directions. For most readily available engineering materials, the elastic modulus permits strains of approximately 2% before plastic deformation occurs. In some special cases, this allowable strain rate may be as high as 6% (for example nickel-titanium type alloys called super-elastic materials). When considering a climbing surface, irregularities in the surface can be defined by the radius of curvature. In order to accommodate large variations in the climbing wall, the suspension must match the curvature of the surface irregularities. This induces strain in the compliant beam suspension proportional to the curvature, and will exceed allowable strain levels for any typical climbing terrain. The second limitation is that lateral forces along the axis transverse to the axis of the endless track and lying in a plane tangent to the climbing surface at each point along the beam are large, and must be transferred through the compliant beam to the platform chassis at the endpoints.

BRIEF SUMMARY OF THE INVENTION

The invention disclosed in this patent provides a novel means to distribute the climbing forces in an optimal manner over all adhering track elements and transfer these to the climbing platform, while applying a positive surface normal force on the leading adhering member to ensure that it makes contact with surface when climbing. Further, it does this without inducing any strain the suspension members that guide the endless track, and it supports lateral along the length of the endless track. It does this through the following manner:
 1) The invention offers a suspension that is able to match a large range of surface irregularities without inducing strain in the primary suspension member. It does this by creating the primary suspension member, called the track link guide member, as a serial chain of links connected by revolutes that can independently flex without strain. The invention maintains a slidable connection with the endless tracks along the contact portion by designing all adjoining links to be conjugate, to maintain a solid, uniform slot along the slidable connection. Further, the invention allows for the track link guide member to change length to accommodate changing surface curvature while maintaining fixed contact points with the vehicle chassis through one or more prismatic connections in the links.
 2) The invention also shows a suspension with a series of lateral force dyads that transmit lateral forces directly from the track to the climbing platform along the length of the track. These lateral force dyads transmit force while accommodating displacement of the suspension.
 3) The invention prescribes the surface-normal load distribution on all the adhering members through a series of springs integrated into the lateral force dyads.

The proposed invention provides the primary features of the 2010 Canfield and Beard patent application—it provides a means to uniformly distribute the normal-surface forces among the adhering members, while solving the two primary limitations of the 2010 Canfield and Beard patent application.

DETAILED DESCRIPTION OF THE INVENTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The invention disclosed here is a multi-link suspension apparatus that is designed to function as an integral part of climbing machine making use of an endless track. The multi-link suspension apparatus is slidably connected to the endless track and prescribes specific stiffness (or compliance) in five spatial directions between the climbing surface and the climbing machine body. These include all cardinal directions in three-dimensional space except the direction of the axis of the endless track.

Stiffness (or contrarily, compliance) in the multi-link and spring suspension apparatus is prescribed through a combination of track link guide member, lateral force dyads, force distribution mechanism and endless track tensioning system.

In operation, the climbing vehicle body is subject to a variety of forces, including gravitational and dynamic loads associated with the vehicle and payload motion, as well as forces generated by the operation of the tooling or equipment attached to the vehicle. To remain in equilibrium (static and dynamic) with the climbing surface, these forces are to be transferred to the climbing surface through the endless track and adhering track members.

The mechanism of this invention prescribes how these forces are transmitted from the vehicle body to the adhering track members over a wide range of surface irregularity or contours. The forces are prescribed through the compliance of the force distribution mechanism and stiffness in the primary track links member and lateral force dyads.

Figure 10:
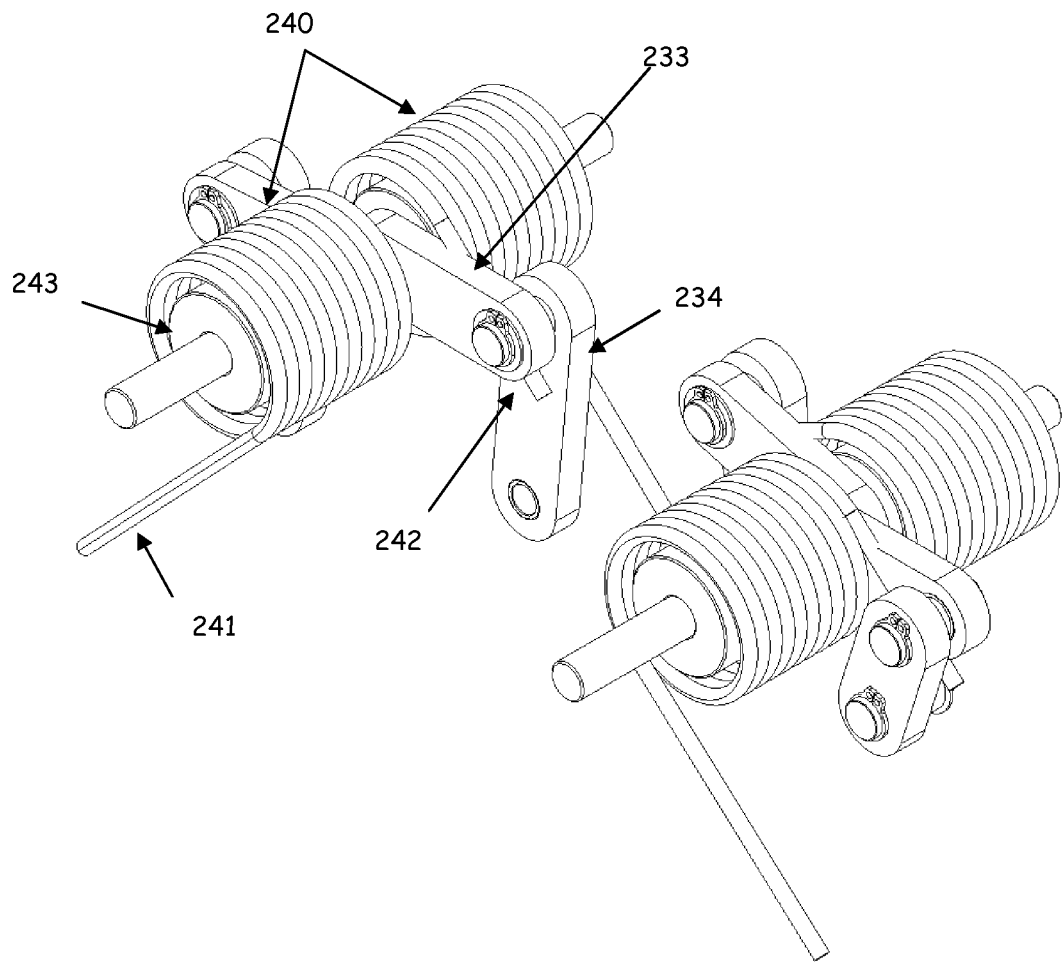
FIG. 10 shows the force distribution member.
Figure 11:
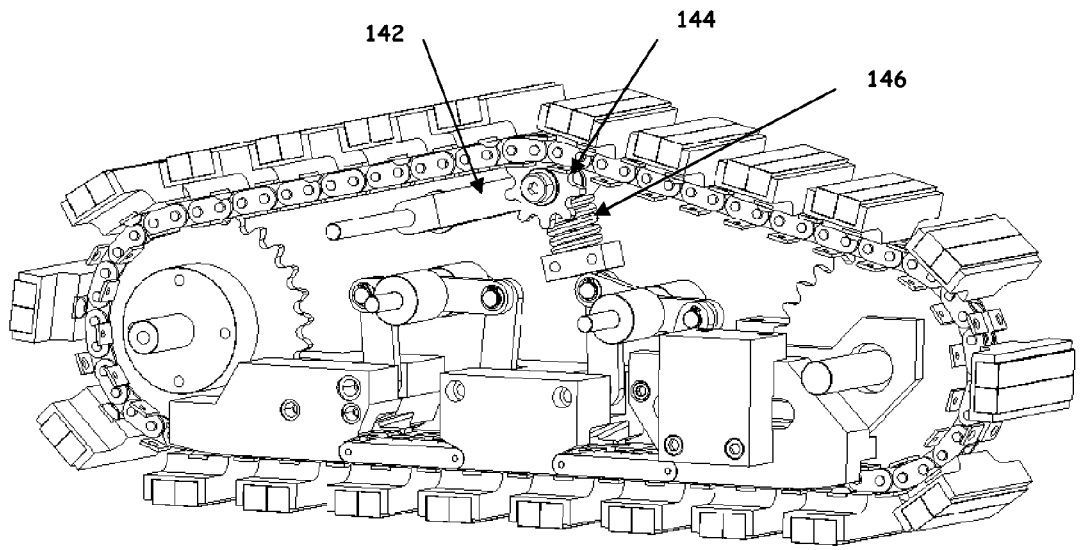
FIG. 11 shows the track tensioning system.
Figure 12:
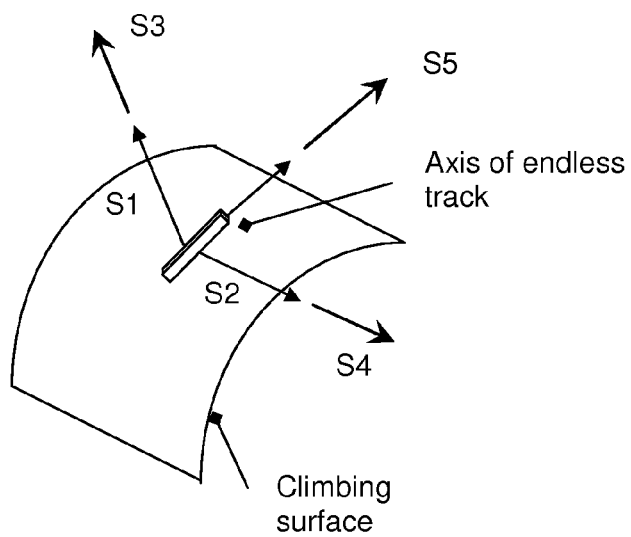
FIG. 12 shows a climbing surface with defined directions.
Throughout the figures identical reference numerals denote identical components.

The invention prescribes the stiffness between the climbing platform chassis and endless track in five directions as shown in FIG. 10; S1) linear stiffness normal to the climbing surface, S2) linear stiffness in the plane of the climbing surface and normal to the axis of the endless track, S3) rotational stiffness about an axis normal to the climbing surface, S4) rotational stiffness about an axis in the plane of the climbing surface and normal to the axis of the endless track and S5) rotational stiffness about the axis of the endless track.

The stiffness in direction S1 is prescribed along the entire track to uniformly distribute the forces on the adhering track members. The stiffness in direction S2 is prescribed to limit transverse deflection of the endless track (high stiffness) The stiffness in direction S3 is prescribed to limit rotation of the endless track (high stiffness) about an axis normal to the climbing surface. The stiffness in direction S4 is prescribed to allow low stiffness along the center portion of the endless track to accommodate contours or irregularities in the climbing surface, and high stiffness where the endless track engages the track sprockets. The stiffness in direction S5 is prescribed to allow low stiffness along the center portion of the endless track to accommodate contours or irregularities in the climbing surface, and high stiffness where the endless track engages the track sprockets.

This invention that achieves the prescribed stiffness consists of four primary components: track link guide member, lateral force dyads, force distributing mechanism and endless track tension adjusting device. The first part is the track link guide member. The track link guide member is slidably connected to the endless track in the contact region. The track link guide member consists of a collection of central links connected serially with a revolute joint and two end links. One end of each central link is concave and the other end convex. At each revolute joint where two links are connected, the convex portion moves inside the concave portion in a conjugate fashion. One or more portions of the track link guide member contains primatics to allow a change in length. At each end of the track link guide member, the track link guide member is connected to the chassis through a revolute joint. The slidable portion of both end links are located tangent to a circle centered at the sprocket pivot, the diameter of this circle is equal to the pitch diameter of the corresponding sprockets. The length of the central links is generally selected to equal 1-2 times the pitch of the endless track members (1-2 times the distance between each endless track member). The serial chain possesses (n+1) degrees of freedom where n is the number of central links in the track link guide member. Note that all revolutes in the track link guide member lie along an axis transverse to the axis of the endless track and parallel to the plane of the climbing surface along the endless track. The track link guide member provides a continuous connection to the endless track along the contact region and allows for large deflection of endless track to adapt to the climbing surface. Note also that the track link guide member could connect to the vehicle chassis through a force distributing mechanism.

The second part of the multi-link suspension apparatus consists of a collection of lateral-force dyads which can be made of two-link pairs, prismatic pairs, or other members. Here, the two-link pair is discussed. One end of each lateral-force dyad is connected to the climbing platform with a revolute. The other end of the lateral-force dyad is connected to the track link guide member through a revolute. All revolutes on the lateral-force dyad are parallel to the revolutes in the track link guide member. The collection of lateral-force dyads serve to provide support to the track link guide member to resist transverse forces on the endless track along the contact region. Thus, the lateral-force dyads resist transverse forces that arise when the climbing platform is turning.

The third component is a force distribution element consisting of a series of springs actuators, or other device that can permit displacement while controlling force, springs will be discussed here. These force distribution elements generally run in parallel with the dyad links. These force distribution springs may be extension, compression, torsional or other type. These force distribution springs connect the climbing platform chassis to the primary track links member to provide a specified stiffness in a direction normal to the climbing surface. The stiffness of each spring is selected to distribute the climbing forces uniformly among the adhering elements.

The fourth component of the multi-link suspension apparatus consists of a tensioning system to maintain a constant tension in the endless track while the system deflects to accommodate irregularities in the climbing surface.

Figure 1:
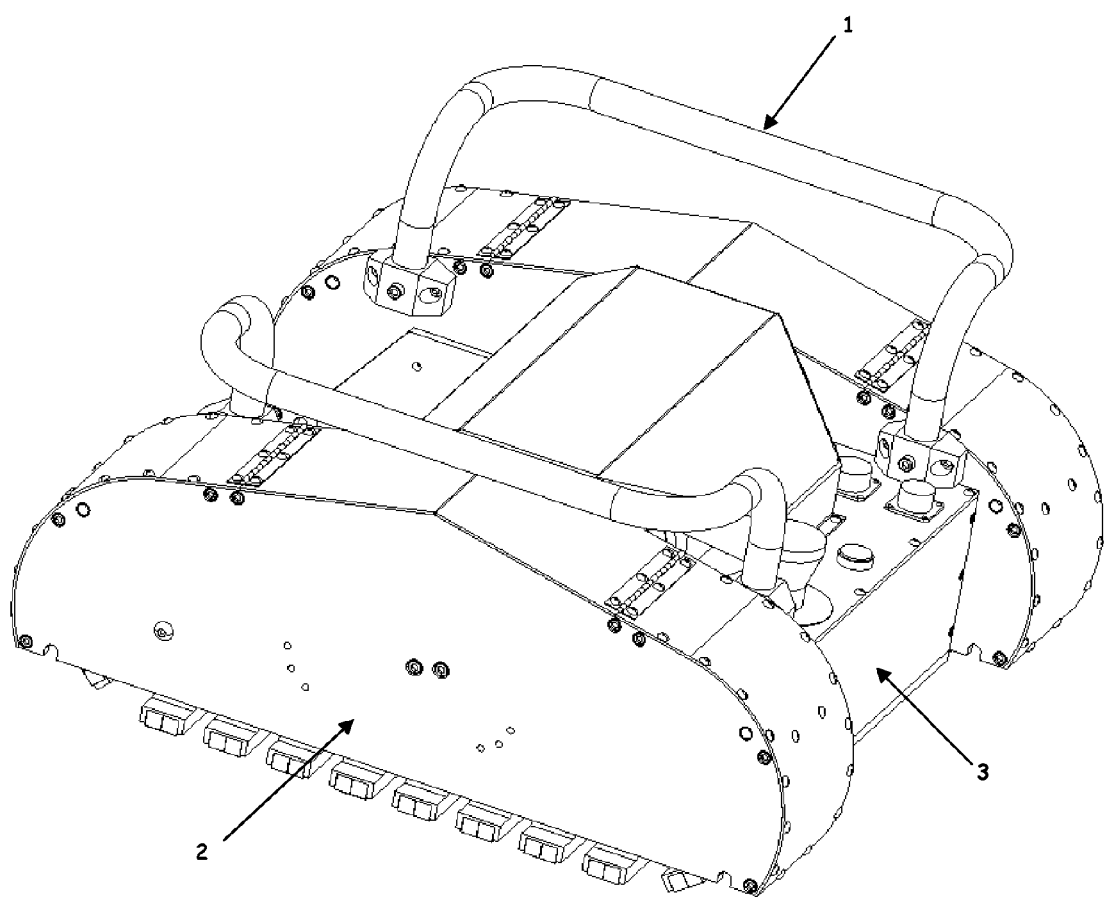
FIG. 1 shows an isometric view of the climbing platform.
Figure 2:
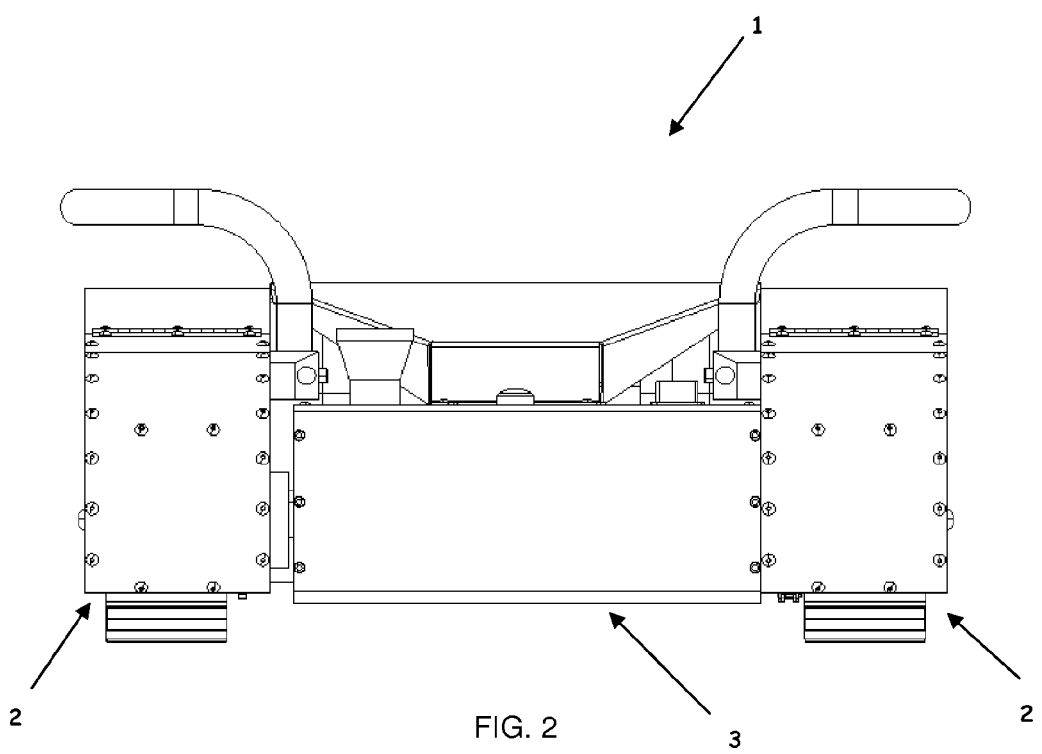
FIG. 2 shows an end view of the mobile climbing platform.
Figure 3:
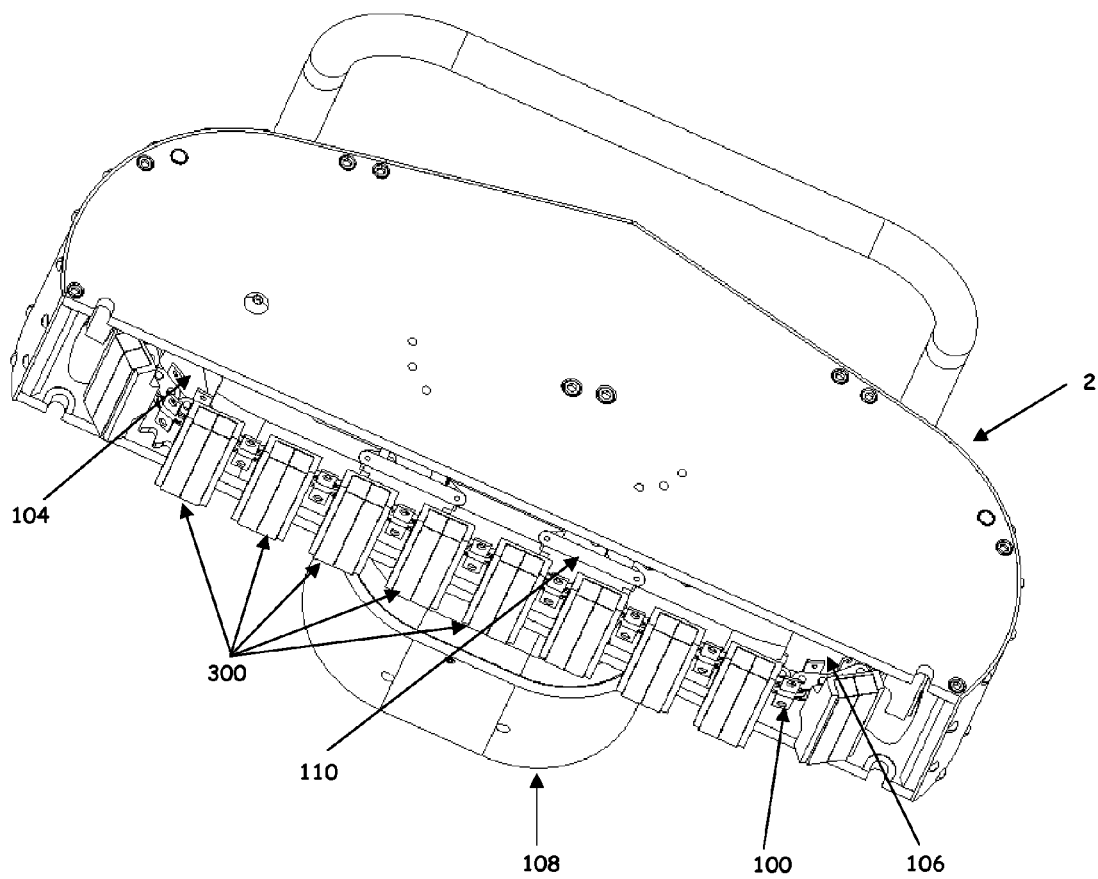
FIG. 3 shows a single endless track unit of the mobile climbing platform.

FIGS. (1) and (2) show a mobile climbing platform 1 consisting of two track units (2) and a connecting chassis (3). The chassis connects two or more track units in either a rigid fashion, or can allow some range of relative motion between two or more track units to allow the track units to better adapt to the climbing surface geometry. The track units are geometrically similar and symmetric; one is shown in FIG. 3. The track unit consists of an endless track (100) with an exterior side and interior side with a collection of permanent magnet feet (300) or other adhering members attached to the exterior side of the endless track. The endless track (100) passes around a drive sprocket (104) and track sprocket 106 and passes through the multi-link suspension system (110). A drive unit (108) for the track unit can be located internally or externally to the track unit (2) and can include drive motor, transmission, encoder and brake.

Figure 4:
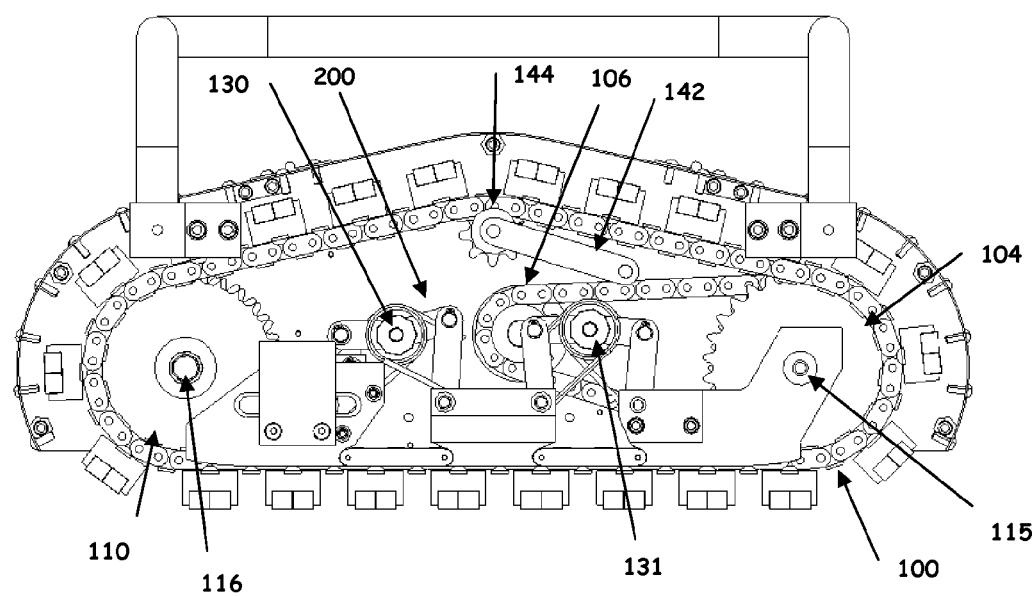
FIG. 4 shows an endless track unit with the interior portions exposed.

FIG. 4 shows the internal components in the track unit. The drive sprocket (104) is pivotally attached to the track frame and connected to the transmission output sprocket (106) through chain (108). The endless track tensioning mechanism consists of an arm (142) pivotally connected to the track frame and an idler sprocket (144) pivotally attached to the tensioning arm (142). The track sprocket (110) is pivotally attached to the track frame. The endless track (100) engages the drive sprocket, track sprocket and tensioning sprocket. The multi-link and spring suspension apparatus (200) is pivotally attached to the drive sprocket (104) by revolute joint (115) and the track sprocket (110) by revolute joint (116) and to the track unit frame at revolute joints (130), (131), (132).

Figure 5:
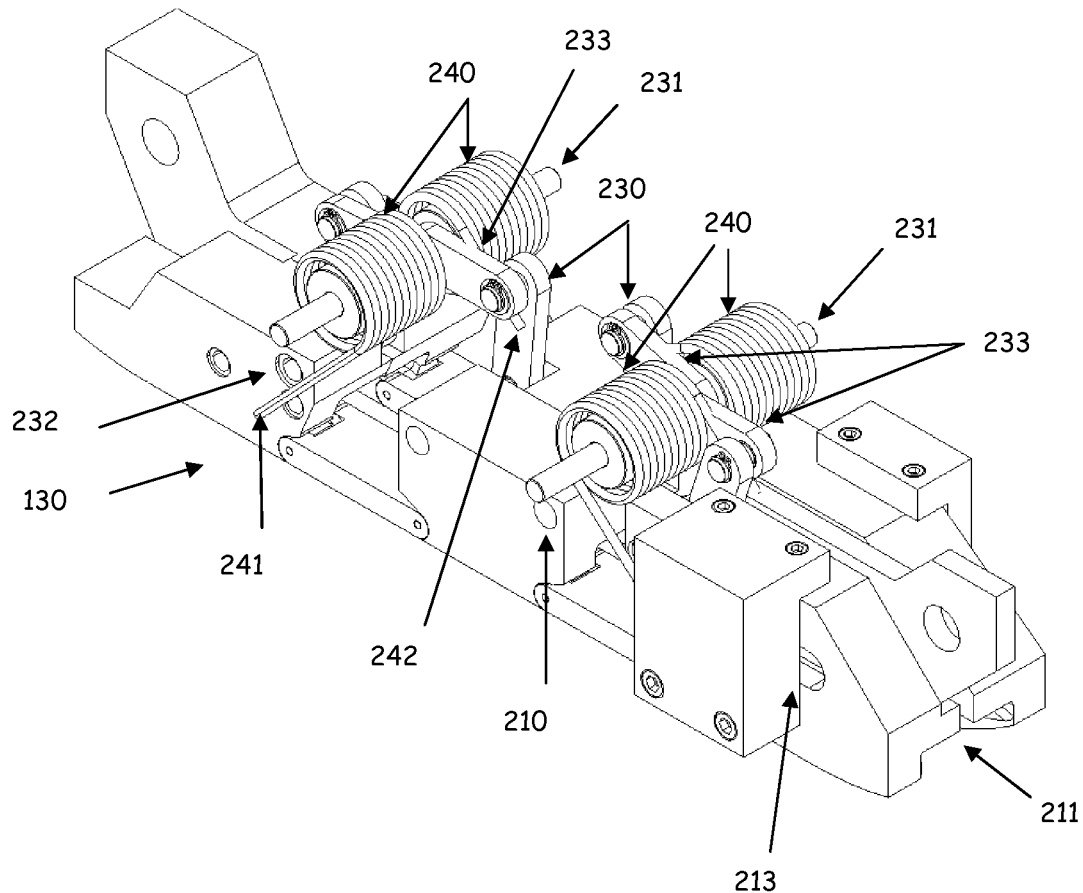
FIG. 5 shows the multi-link suspension apparatus.

FIG. 5 shows the multi-link suspension apparatus (200) isolated from the track unit. The multi-link suspension apparatus consists of a track link guide member (210), one or more lateral force dyads (230) and one or more force distribution elements (240). FIG. 5 shows four lateral force dyads (230) and four force distribution elements (240). The track link guide member (210) guides the endless track along a slidable connection through a slot in the track link guide member (211). The links of the track link guide member are connected to each other through revolute joints (212) and one or more prismatic joints (213) and connect to the track unit through revolute joints (214). The lateral force dyads (230) are connected to the track link guide member (210) with a revolute joint (231) and connect to the track unit through revolute joints (232). The force distribution elements (240) transfer loads from the endless track through the track link guide member (210) to the track unit. Four force distribution elements (240) are shown on the multi-link suspension apparatus in FIG. 5 as rotational springs that create a torque on the input link (233) of the lateral force dyad (230) and thus create a tensile force on the track link guide member. One end of the force distribution element (241) connects to the track unit while the other end (242) is connected to the input link (233) of the lateral force dyad. Note that other methods for the force distribution element could be used including linear springs, pneumatic or electric actuators. The multi-link suspension apparatus serves multiple roles; it allows the track to adhere to uneven track surfaces, it distributes the load in a preferred manner over the individual magnetic elements attached to the endless track, and it allows the mobile climbing robotic welding system to operate in horizontal, vertical and inverted orientations.

Figure 6:
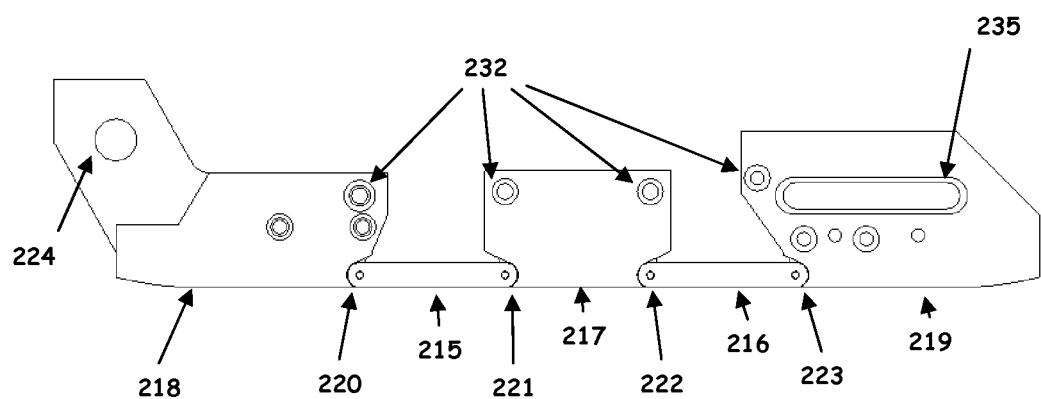
FIG. 6 shows the track link guide member.

The track link guide member is shown isolated in FIG. 6. The track link guide member is slidably connected to the endless track in the region in which the adhering members of the endless track make contact with the climbing surface or contact region. The track link guide member consists of a collection of track links that are connected through revolute joints in a series chain. The track links can be one of several types; binary central links (215), (216), load central links (217), pivot end link (218) and sliding end link (219). The binary central, load central and pivot end links are connected serially with revolute joints at (220), (221), (222) and (223). The sliding end link is connected to the binary central link through a sliding connection at (235). Each of the track links consists of an outer side and inner side. The inner side of each track link contains a slot with dimensions appropriate to accept a mating protrusion (101, FIG. 7) on the interior side of the endless track. The track link members are connected in a way to maintain a continuous, open slot passing through the track link guide member. The revolute joints that connect the track links are located in such way that adjacent, connected track links share an instant center that passes through the centerline of the slot. The track link members are connected in a way to maintain a smooth transition of the slot passing through the track link guide member, but making each track link member a conjugate pair of its adjacent track link member. As an example of how this is done, one end of each central link is concave and the other end convex. At each revolute joint where two links are connected, the convex portion moves inside the concave portion in a conjugate fashion. One end of the pivot end link (218) is connected to the drive sprocket axis through a revolute joint (224). One end of the sliding end link (219) is attached to the track sprocket axis through a revolute joint. The lateral force dyads connect to the track link guide member at revolute joints (232). The endless track slot portion of the pivot end link and sliding end link are located tangent to a circle centered at the sprocket pivot, the diameter of this circle is equal to the pitch diameter of the corresponding sprockets. The length of the binary central links and load central links are generally selected to equal 1-2 times the pitch of the endless track members (1-2 times the distance between each endless track member). The serial chain possesses (n+1) degrees of freedom where n is the number of central links in the track link guide member. Note that all revolutes in the primary track links member lie along an axis transverse to the axis of the endless track and parallel to the plane of the climbing surface along the endless track.

Figure 7:
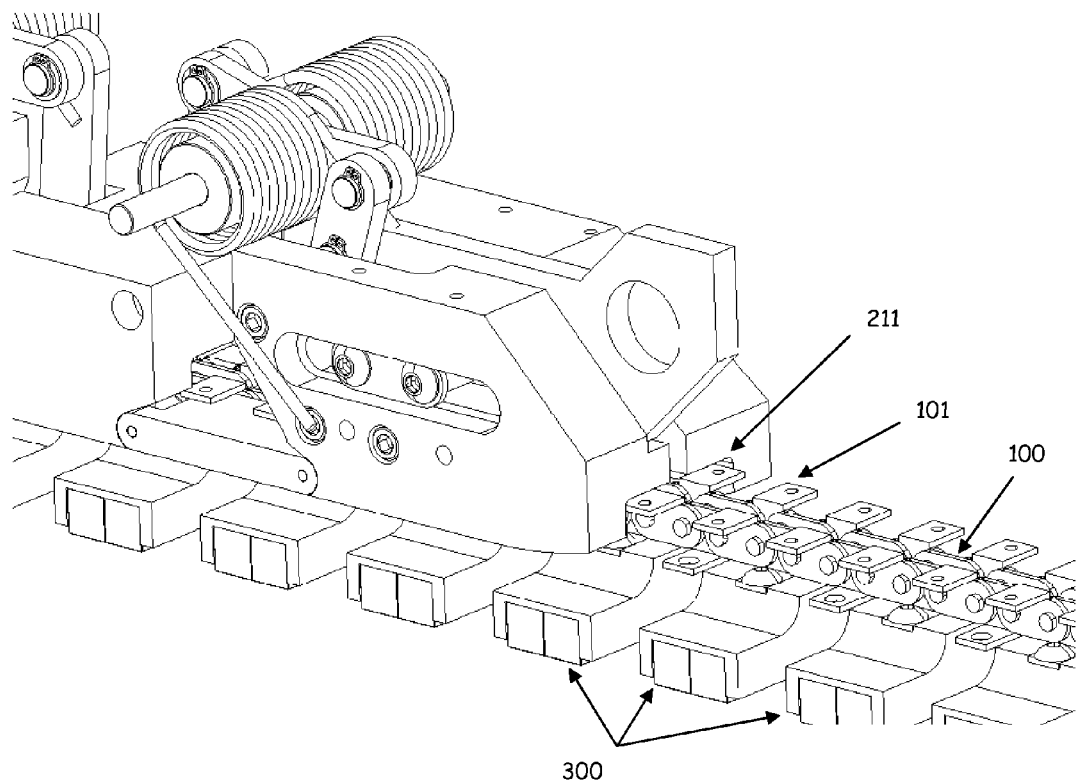
FIG. 7 shows an isometric view of the connection between the track link guide member and endless track.

FIG. 7 shows more detail of the slidable connection between the track link guide member (210) and the endless track (100). The slot in the track link guide member (211) is matched in dimension to the protrusion (101) on the endless track. The protrusion (101) of the endless track can freely slide in one dimension through the slot (211) along the longitudinal axis of the track link guide member. The slot (211) can transfer forces to the protrusion (101) in directions transverse to the longitudinal axis of the track link guide member. The protrusion (101) on the endless track can consist of a flange as shown or other mating element such as a roller.

Figure 8:
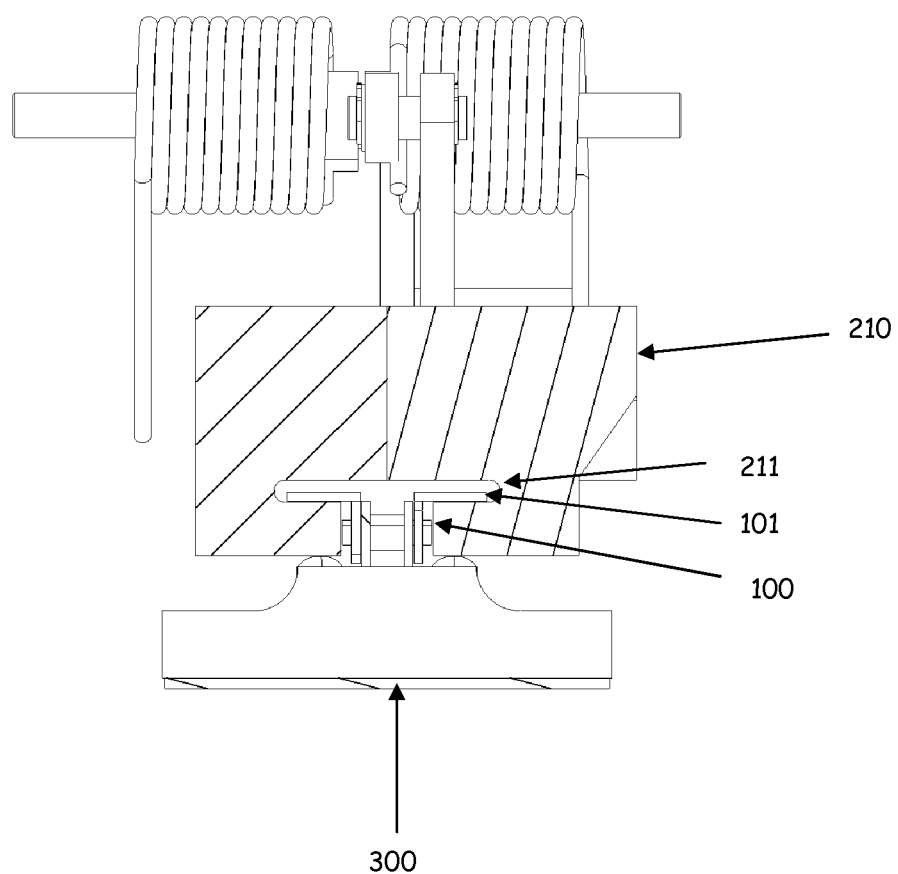
FIG. 8 shows a cross-sectional view of the connection between the track link guide member and endless track.

FIG. 8 shows a cross-section view of the slidable connection between the track guide member (210) and the endless track (100). The slot in the track link guide member (211) is matched in dimension to the protrusion (101) on the endless track. The protrusion (101) of the endless track can freely slide in one dimension through the slot (211) along the longitudinal axis of the track link guide member. The slot (211) can transfer forces to the protrusion (101) in directions transverse to the longitudinal axis of the track link guide member. The protrusion (101) on the endless track can consist of a flange as shown or other mating element such as a roller.

Figure 9:
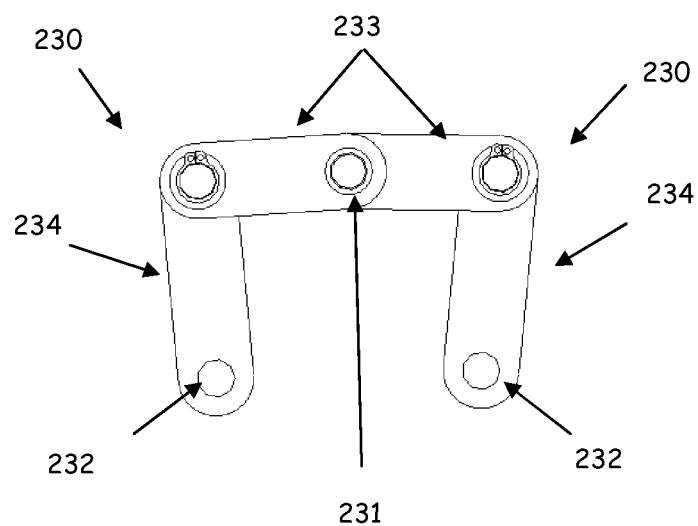
FIG. 9 shows a lateral force dyad.

FIG. 9 shows a lateral force dyad (230). The lateral force dyad consists of a two link pair, one the input link (233) and the second a coupler link (234). The input link (233) connects to the track unit through a revolute joint (231). The coupler link connects to the track link guide member through a revolute joint (232). All revolutes on the lateral-force dyad are parallel to the revolutes in the track link guide member. The links in the lateral force dyad and bearings that form the revolutes are designed to support transverse (out of plane) loads and thus transmit these transverse loads from the track link guide member to the track unit.

The third component is a force distribution element (240) as shown in FIG. 10. The force distribution element in general can consist of a series of springs that generally run in parallel with the dyad links. FIG. 8 shows the force distribution element (240) as a torsion spring that lies on a support spool (243). One end (241) of the torsion spring pushes against the track unit while the other end (242) pushes against the input link (233) of the lateral force dyad and thus can create tensile forces in the coupler link (234) and apply tension or compression forces on the track link guide member. The force distribution springs are selected through an optimal synthesis process that has uniform load distribution on the adhering members as its objective function, and uses a mechanics model of the system over representative climbing surfaces to evaluate the objective function over the design parameters. These force distribution springs connect the climbing platform chassis to the track link guide member to provide a specified stiffness in a direction normal to the climbing surface. The stiffness of each spring is selected to distribute the climbing forces uniformly among the adhering elements.

The fourth component of the multi-link and spring suspension apparatus consist of a track tensioning system to maintain a constant tension in the endless track while the system deflects to accommodate irregularities in the climbing surface. FIG. 9 shows the track tensioning system. The endless track tensioning mechanism consists of an arm (142) pivotally connected to the track frame and an idler sprocket (144) pivotally attached to the tensioning arm (142) and is tensioned through a spring (146).

What is claimed is:
1. An endless-track climbing vehicle for traversing a climbing surface comprising
 a chassis,
 an endless track revolving about the chassis having an interior portion and an exterior portion, with a plurality of adhering members capable of producing an attracting force with the climbing surface and attached to the exterior portion of the endless track and a protrusion such as a flange or rolling element attached to the inner portion of the endless track, a drive mechanism attached to the chassis comprising a drive wheel and drive source, with the drive wheel engaging the interior portion of the endless track for driving the endless track, a suspension apparatus comprising a track link guide, a force distribution member, and a track tensioning device, the track link guide further comprising a plurality of suspension links, the suspension having an adjacent suspension link, the suspension link further having an interior and exterior portion, the interior portion having a slot, with the slot dimensions configured to mate with the protrusion of the endless track, the suspension link connected to the adjacent suspension link with a pivot or slidable connections with the pivots or the slidable connections positioned to maintain a slidable transition of the slot along the suspension links, the force distribution member such as a spring connecting the track link guide to the chassis, the force distribution member selected to uniformly distribute the forces required for climbing along the endless track and the adhering force members, an endless track tensioning device comprising an idler wheel engaging the interior portion of the endless track and supported by the chassis through an elastic member.

2. A device as in claim 1, in which the amount of force in each force distribution member is adjustable.

3. A device as in claim 1 in which the force distribution member is an elastic member with a nonlinear relationship between force and displacement.

4. A device as in claim 1 in which the force distribution member is an elastic member such as a gas spring that will allow a the modulus or relationship between force and displacement to be changed during operation of the endless track vehicle.

5. A device as in claim 1 with an endless-track tensioning device that maintains a constant tension in the endless track while allowing the amount of endless track slidably connected to the track link guide member to change in length as the multi-link mechanism changes length.

6. A device as in claim 1 with the track link guide member connected at each end to the chassis by pivot joints.

7. A device as in claim 1 with the track link guide member connected at each end to the chassis by transfer force members that apply force on the track link guide member according to the climbing conditions.

8. A device as in claim 1 in which the protrusion on the endless track is a roller element that is connected to the endless track through a pivot and mates with the slot in the track link guide.

9. A device as in claim 1 with force distribution member comprising a lateral force dyad and a force distribution element, the lateral force dyad a pair of links pivotally connected at one end to the chassis and at the other end to the track link guide to support lateral forces.

10. A device as in claim 9 in which a plurality of lateral force dyads connect the track link guide to the chassis, that maintain the track link guide member to move only in a plane.

11. A device as in claim 9 in which a plurality of force distribution elements are elastic members and connect the track link guide to the chassis, and uniformly distribute the forces required for climbing along the endless track and adhering force members.

12. A device as in claim 9 in which the force distribution elements are actuated members and connect the track link guide member to the chassis, and uniformly distribute the forces required for climbing along the endless track and adhering force members.

13. An endless-track climbing vehicle for traversing a climbing surface comprising a chassis, an endless track revolving about the chassis having an interior portion and an exterior portion, with a plurality of adhering members capable of producing an attracting force with the climbing surface and attached to the exterior portion of the endless track and a protrusion such as a flange or rolling element attached to the inner portion of the endless track with a slot formed by the protrusion on the interior portion or by a combination of the protrusion on the interior portion and the exterior portion, a drive mechanism attached to the chassis comprising a drive wheel and drive source, with the drive wheel engaging the interior portion of the endless track for driving the endless track, a suspension apparatus comprising a track link guide, a force distribution member, and a track tensioning device, the track link guide further comprising a plurality of suspension links, the suspension having an adjacent suspension link, the suspension link further having an interior and exterior portion, the interior portion having a guide protrusion such as a flange or roller element, with the guide protrusion dimensions configured to mate with the slot formed by the protrusion on the interior portion of the endless track, the suspension link connected to the adjacent suspension link with a pivot or slidable connections with the pivots or the slidable connections positioned to maintain a slidable transition of the guide protrusion along the suspension links, the force distribution member connecting the track link guide to the chassis, the force distribution member selected to uniformly distribute the forces required for climbing along the endless track and the adhering force members, an endless track tensioning device comprising an idler wheel engaging the interior portion of the endless track and supported by the chassis through an elastic member.

* * * * *